R. E. L. JANNEY.
CAR COUPLING.
APPLICATION FILED JAN. 20, 1911.
1,093,858.
Patented Apr. 21, 1914.
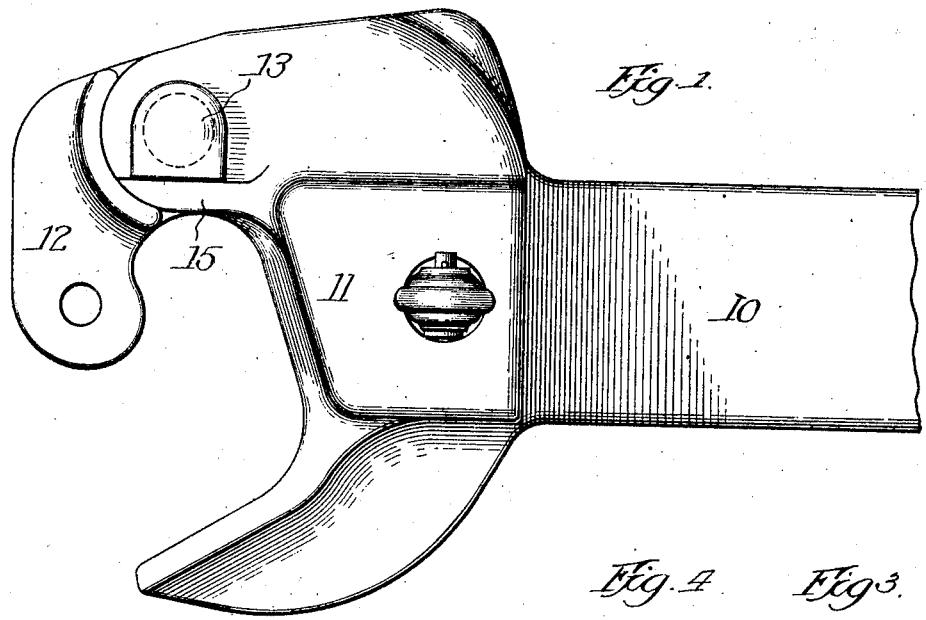
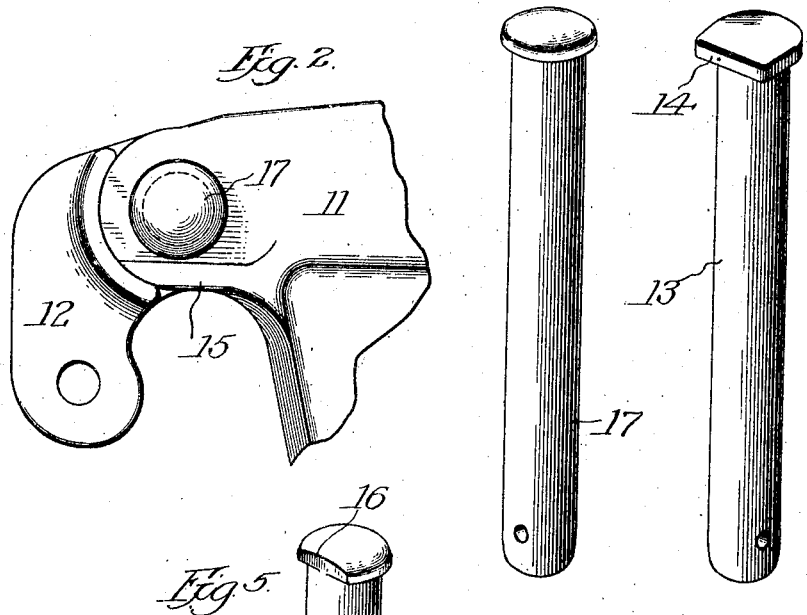
Witnesses:
Inventor
Robert E. L. Janney
By Linthicum Belt Fulk,
Attys.

UNITED STATES PATENT OFFICE.

ROBERT E. L. JANNEY, OF CHICAGO, ILLINOIS, ASSIGNOR TO AMERICAN STEEL FOUNDRIES, OF NEW YORK, N. Y., A CORPORATION OF NEW JERSEY.

CAR-COUPLING.

1,093,858. Specification of Letters Patent. Patented Apr. 21, 1914.

Application filed January 20, 1911. Serial No. 603,638.

*To all whom it may concern:*

Be it known that I, ROBERT E. L. JANNEY, a citizen of the United States, residing at Chicago, in the county of Cook and State of Illinois, have invented certain new and useful Improvements in Car-Couplers, of which the following is a specification.

My invention relates to couplers and particularly to couplers of the Janney type, wherein is provided a coupler head, a pivoted knuckle and a locking member.

My invention has particular reference to the pin on which the knuckle is pivoted and to means in connection therewith for preventing said pin from turning with the knuckle when the latter is swung to open and closed positions. For well known reasons it is desirable to prevent the turning of the pivot pin and various means have been devised for accomplishing that result, all of which have been successful as long as used with the pin designed therefor. However, the knuckle pin is frequently broken through shocks and strains, or works out and becomes lost. Then unless the special pin adapted for that coupler is at hand for repairs, the coupler and car are out of service until the coupler is replaced or the special pin procured. For these reasons I have devised a coupler having an upstanding flange with which a special D-head pin is adapted to coöperate to prevent said pin from turning but which flange or rib is far enough removed from the longitudinal axis of the pin to permit the insertion for repairs of an ordinary round head pin such as is always carried in the equipment of trains. Such round head pin, of course, will not be prevented from turning but will permit of the safe operation of the coupler until proper repairs can be supplied.

My invention will be more readily understood by reference to the accompanying drawings wherein, Figure 1 is a plan view of a coupler showing my improved D-head pin applied thereto. Fig. 2 is a fragmentary view showing the application of an ordinary round head pin to the coupler. Fig. 3 is a perspective view of the D-head pin of my invention. Fig. 4 is a like view of a round head pin, and Fig. 5 is a similar view of the D-head pin as commonly formed.

Referring more particularly to the drawings it will be seen that my invention is applied in this instance to a standard Janney type coupler, composed of a shank 10, a head 11, a pivoted knuckle 12 and a D-head knuckle pivot pin 13. Heretofore it has been the custom to provide a D-head pin by tangentially shearing off a portion of the head of the pin, as shown at 16 in Fig. 5, but in the pin of my invention I form the head with a continuous flange, one side of the flange, however, being squared as at 14. This squared portion coöperates with an upstanding flange or rib 15, on the coupler head 11, which flange is far enough removed from the pivot pin hole to permit the insertion of a standard round head knuckle pin 17, but which forms an abutment for my novel D-head pin and prevents the turning thereof.

While I have shown my invention as applied to a certain type of coupler, it is obvious that it might be applied to other types with facility; also that modifications may be made therein such as relate to the location of the upstanding flange on the coupler head and the extent of the squared portion of the pin head, all without departing from the spirit of the invention.

I claim:

In a car coupler, a coupler head having a vertical aperture for a pivot pin, and an abutment adjacent to said aperture, in combination with a D-head knuckle pin having its squared portion overhanging the side of the pin and adapted to contact the abutment, the latter being so located with reference to the pin aperture as to permit the use of the standard round-head pin, substantially as described.

ROBERT E. L. JANNEY.

Witnesses:
S. M. DARLING,
A. TREVOR JONES.